United States Patent [19]

Flory

[11] Patent Number: 5,415,490
[45] Date of Patent: May 16, 1995

[54] ROPE TERMINATION WITH CONSTANT-CROSS-SECTION, DIVIDED-CAVITY POTTED SOCKET

[76] Inventor: John F. Flory, 4 Tower La., Morristown, N.J. 07960

[21] Appl. No.: 90,771

[22] Filed: Jul. 13, 1993

[51] Int. Cl.⁶ ............................................. B25G 3/34
[52] U.S. Cl. .................................... 403/267; 403/268; 403/298; 24/122.6
[58] Field of Search ............... 403/265, 267, 268, 269, 403/275, 298, 359; 24/122.6

[56] References Cited

U.S. PATENT DOCUMENTS

| | | | |
|---|---|---|---|
| 2,686,963 | 8/1954 | Freyssinet | 24/122.6 |
| 2,934,364 | 4/1960 | Conversy | 403/275 |
| 3,328,229 | 6/1967 | Windecker | 403/267 |
| 3,409,951 | 11/1968 | Morieras | 24/122.6 |
| 3,468,569 | 9/1969 | Ballard et al. | 403/267 |
| 3,507,949 | 4/1970 | Campbell | 403/267 |
| 3,570,074 | 3/1971 | Schimmeyer et al. | 403/267 |
| 3,600,765 | 8/1971 | Rovinsky | 24/122.6 |
| 3,660,887 | 5/1972 | Davis | 403/268 |
| 3,739,457 | 6/1973 | Davis | 403/275 |
| 4,200,768 | 4/1980 | Anhalt et al. | 403/267 |
| 4,279,531 | 7/1981 | McKenzie | 403/267 |
| 4,295,250 | 10/1981 | Dupuy | 403/268 |
| 4,557,007 | 12/1985 | Dalguji et al. | 14/22 |
| 5,315,066 | 5/1994 | Spiteri, Jr. | 403/268 |

FOREIGN PATENT DOCUMENTS

| | | |
|---|---|---|
| 838057 | 6/1960 | United Kingdom . |
| 1020432 | 2/1966 | United Kingdom . |
| 1056990 | 2/1967 | United Kingdom . |
| 1244275 | 8/1971 | United Kingdom . |
| 1300265 | 12/1972 | United Kingdom . |
| 2091770 | 8/1982 | United Kingdom . |

OTHER PUBLICATIONS

United Ropeworks (USA) Inc., Technical Bulletin, 356, "Potting Procedure: Phillystran HPTG", (Jan. 1989).
Crosby Group Inc. Catalog, (1987), p. 33, Open and Closed Spelter Sockets.
United Ropeworks (USA) Inc., Technical Bulletin, 109, "Socketfast Blue", (Jun. 1985).
United Ropeworks (USA) Inc., Bulletin, 120, "Phillystran End Terminations", (May 1987).

Primary Examiner—Richard A. Bertsch
Assistant Examiner—Howard R. Richman

[57] ABSTRACT

An improved termination for rope (2) in which ends of rope elements (4) are encapsulated in resinous material (6) to form a fiber-and-resinous-material composite-mixture plug (8) within a tapered cavity (16) that is divided by radial plates (36) into smaller segments (46) and is partially filled with a tapered body (32) to provide a constant cross-sectional area.

19 Claims, 3 Drawing Sheets

ROPE TERMINATION WITH CONSTANT-CROSS-SECTION, DIVIDED-CAVITY POTTED SOCKET

BACKGROUND

1. Field of Invention

This invention relates to an improved termination for the end of a fiber rope or other flexible tension member in which the ends of the fibers or other tension member elements are encapsulated in resinous material to form a plug within a tapered cavity that is divided by radial plates into smaller segments and is partially filled with a tapered body to provide a constant cross-sectional area.

2. Description of Prior Art

Conventional Potting Technology

Ropes are commonly terminated in potted sockets. Fiber ropes are prepared by untwisting the strands and yarns, and brooming out the fibers. The broomed fibers are placed within a tapered cavity in a barrel. There they are filled, mixed, and encapsulated with a resinous material which then sets and hardens. The resulting fiber-and-resinous-material-mixture plug is essentially a composite material which resists pullout from the tapered cavity in the barrel.

An example of the preparation and potting procedure is given in United Ropeworks (USA) Inc. Technical Bulletin 356 "Potting Procedure: Phillystran ® HPTG (1989). Other examples are given by Morieras in U.S. Pat. No. 3,409,951, Campbell in U.S. Pat. No. 3,507,949, and Dupuy in U.S. Pat. No. 4,295,250. An example of the type of socket which is used is the Crosby ® socket, described on page 33 of the Crosby Group Inc. Catalog (1987). An example of the resinous material which is commonly used is Socketfast Blue ®, described in United Ropeworks (USA) Inc. Technical Bulletin 109 (1985).

The term resinous material is not limited here to that particular resin product, nor to the more general family of castable synthetic polymer resins. The term resinous material is intended here to refer to any material which provides adequate strength and adhesion properties and can be poured or injected in a liquid state and will then set to a solid state. The term resinous material thus includes materials which may be softened by heating as well as those which set due to a chemical reaction.

Potted socket terminations of this type offer high strength efficiency on small ropes. However, the efficiency of such potted socket terminations falls off as rope size increases. Many theories have been offered as to the reason for this decrease in strength efficiency.

Attempts have been made to improve potted socket efficiency by varying the properties of the resinous material, for example by making it harder or softer, more elastic or less elastic, and by varying the hardness and elasticity of the resinous material along the length of the socket. Attempts have been made to improve potted socket efficiency by employing elaborate systems to arrange and distribute the fibers within the tapered cavity and to apply tension to the ends of the fibers as the resinous material sets. These attempts have generally not been successful.

Effect of Unequal Load Distribution in Fiber Ropes

Ideally, the tension within the rope is equally distributed among all elements within the rope. This condition will produce the greatest rope breaking strength, as all elements will fail at the same time.

Here the term element refers to any of the hierarchical components of a rope, that is fibers, yarns, or strands. The term fiber and element are generally interchangeable in the context of the following discussions.

If some fibers are more highly loaded than others, then those more highly loaded fibers will fail first. When they fail, the total tension in the rope must then be distributed among the surviving fibers.

For example, let the load be unequally distributed such that a group of 1/5th of the fibers carries a load which is 25% higher than the average fiber load. These more highly loaded fibers would then fail when the rope is tensioned only to 80% (100/125) of its full potential breaking strength. After that 1/5th of the fibers fail, the average load in the remaining 4/5th of the fibers is then 125% (100/80) of that load which they would have to carry if all of the fibers were initially equally loaded. Then as a result, these remaining fibers are loaded to their breaking strength ($125\% \times 4/5 = 100\%$), and they would probably also fail immediately. Thus the entire rope would fail at a tension of only 80% of its full potential breaking strength.

Effect of Related Movement in High-Modulus Fiber Ropes

The stiffness modulus is the slope of the load-extension curve, the ratio of the change in load to the change in fiber extension. If two fibers of different moduli are extended different amounts, then the fiber with the higher modulus will experience the greater load. If two fibers of the same modulus are extended different amounts, then the fiber which is extended more will experience the higher load.

Potted socket terminations are especially favored for high-modulus fiber ropes, such as those made of aramid fiber. The high-modulus fibers are very strong but very stiff. However, only a small difference in extension among high-modulus fibers causes a large difference in load. Thus small relative movements between high-modulus fibers can cause very large differences in fiber loading.

Assume that all the fibers in a rope are initially equally loaded and have the same modulus. Then they are all initially extended the same.

Now permit a first group of fibers to move relative to a second group such that the extensions of the first group is reduced. Then the loads in that first group is also reduced. As a consequence, the loads in the second group of fibers is increased. Such relative movement between fibers is the principal cause of strength inefficiency with large high-modulus fiber ropes in potted terminations.

Reasons For Large-Rope Potted Socket Inefficiency

In a potted termination on a fiber rope, all of the fibers are held tightly within the tapered plug formed within the barrel cavity. This plug is essentially a composite material comprised of the fibers and the resinous material.

The resinous material is not completely rigid; it is elastic and it can deform by compression and by shear. Compression occurs when opposing forces are applied perpendicular to opposite faces of a body of material, causing the opposite faces to move closer together. Shear occurs when opposing forces are applied parallel to opposite faces of a body of material, causing the faces to move parallel to each other in the directions of the opposing forces.

The resinous material on the outer surface of the plug is held by mechanical locking, friction and wedging action against the cavity wall. When tension is applied to the rope and thus to the individual fibers, shear develops within the resinous material between the fibers and the cavity wall. This shear allows the fibers to move forward with relation to the barrel.

The amount of shear which occurs between two points is a function of the width of resinous material between those two points as well as the imposed load. Those fibers which are near the cavity wall have very little resinous material to shear, and their motion will be minimal. Those fibers which are closer to the center of the cavity have more resinous material to shear, and they will move more. The result is a situation in which the fibers near the wall are held against movement, but the fibers near the center of the cavity tend to move forward in the cavity.

As explained above, when equally loaded fibers within a tensioned rope are allowed to move relative to one-another in response to load, the load is transferred to those fibers which move the least.

Those fibers near the center of the cavity move farthest forward, and the load decrease in those fibers is greatest. Those fibers near the cavity wall move forward least and the load increase in those fibers is greatest.

Because the outer fibers become more highly loaded, they will fail at a lower rope tension. When those outer fibers fail, the load which they carried is transferred to other fibers, and the entire rope then fails.

Computer analysis shows that the degree of load imbalance which can occur in a potted socket termination is approximately proportional to the cross-sectional area of the socket cavity cross-sectional area.

The fall off in rope strength efficiency due to this effect is approximately proportional to the rope diameter squared. The cross-sectional cavity areas of the potted sockets used on small ropes is relatively small, and thus there is no apparent fall off in potted socket strength efficiency on such small ropes.

However, the cross-sectional cavity areas of the sockets used on larger ropes are greater, in proportion to the square of the rope diameter. Thus the fall off in strength efficiency is significant in large ropes.

Another effect results from the change in cross-sectional area along the length of the tapered cavity. The cross-sectional area increases with distance from the cavity mouth. The fibers at the mouth of the cavity are more tightly constrained than those further back in the cavity.

The stiffness and strength properties of a composite material mixture of fibers and resinous material depend on the resinous-material volume ratio, that is the volume of resinous material divided by the total volume of material. If there is a low resinous-material volume ratio, then the composite material is very stiff and hard. If the resinous-material volume ratio is high, then the composite material is not as stiff and strong.

The volume of fibers is constant along the entire length of the cavity. However, the volume of the cavity and thus of the volume of resinous material increases from the mouth to the back of the cavity. Thus the resinous-material volume ratio does not increases in linear proportion to the change in cavity cross-sectional area. For example, if the resinous-material volume ratio at the mouth of the cavity is 0.40, then at a point where the cavity cross-sectional area increases by 20%, the resinous-material volume ratio will increase to 0.50, a 25% change.

Thus in a conventional fiber-and-resinous-material filled conical cavity, the composite material is strongest and stiffest at the mouth and becomes less strong and stiff toward the back.

The result is, most of the load transfer between the fibers and the barrel must take place in that portion of the composite material in the narrowest part of the tapered cavity, at the mouth.

Adding fillers, such as a powder, to the resinous material does not overcome this problem, because the filler is equally distributed within the resinous material and does not substantially change its properties. Making the resinous material harder and stronger does not overcome the problem because the fiber material is still much stiffer than the resinous material, and if the resinous material is made too hard, it becomes brittle. Reducing the taper of the cavity in order to make it more constant in cross-sectional area does not solve the problem because the fiber-and-resinous-material-mixture plug can then pull out of the barrel.

OBJECTIVES AND ADVANTAGES

The above explanation and analysis leads to the conclusion that the efficiency of potted socket terminations can be improved by reducing the relative shear movement which can occur between fibers within the composite material plug when the rope is tensioned and by making the properties of the composite more uniform along the length of the tapered cavity.

Accordingly, the objectives and advantages of the present invention are:
  a) To provide a tapered body which partly fills the tapered cavity in the barrel, in order to maintain a substantially constant cross-sectional area and thus achieve uniform properties within the composite material plug.
  b) To divide the cavity into a number of smaller cavities to reduce the apparent cross-sectional area and thus reduce relative shear motions.
  c) To provide smaller cavities which, although essentially constant in cross-sectional area, change substantially in shape along the length of the barrel and thus resist pull-out of the composite material plug.
  d) To provide a means of centering the tapered body so that it is accurately positioned within the tapered cavity.
  e) To provide means of assuring full penetration of the liquid resinous material into the smaller cavities.

Other objectives and advantages of the present invention will become apparent from a consideration of the following description and drawings.

with round tapered body and radial plate insert showing the rope elements distributed in the smaller cavities near the mouth.

Figure 2:
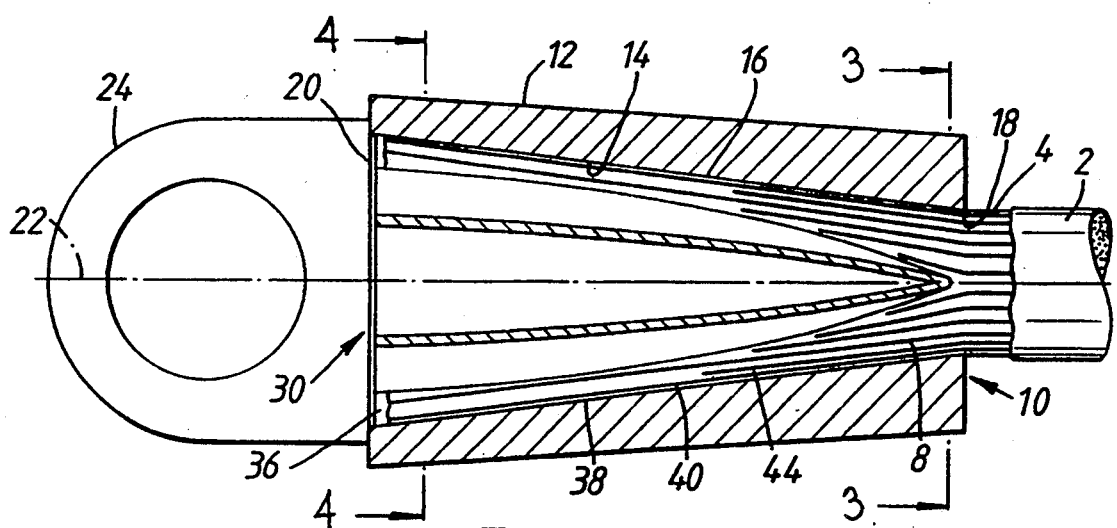
FIG. 2 is a longitudinal cross-section through a potted socket with the tapered body and radial plate insert of FIG. 1 showing the rope element distribution.
Figure 4:
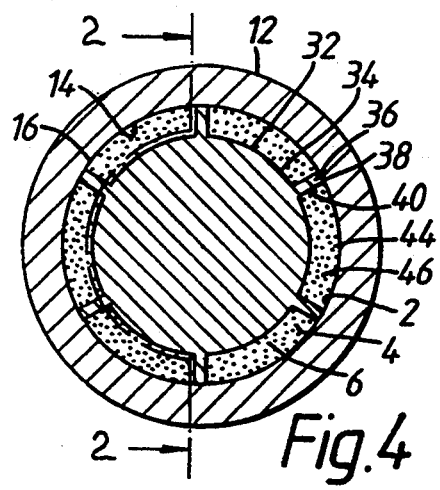

FIG. 4 is a transverse cross-section through a potted socket of FIG. 2 with round tapered body and radial plate insert showing the rope elements distributed in the smaller cavities near the back.

Figure 5:
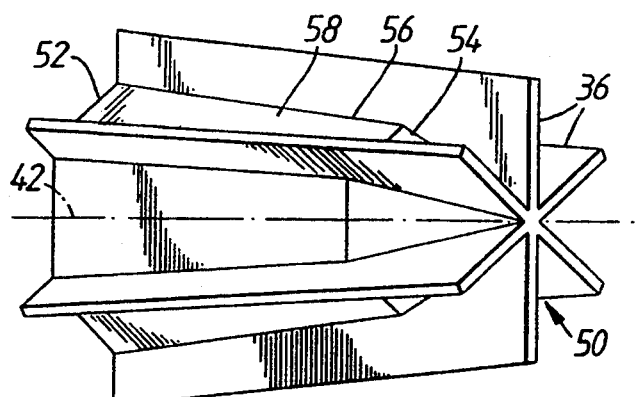

FIG. 5 is a flat-sided tapered body and radial plate insert designed to reinforce and enhance the rope-element/resinous-material mixture within a tapered socket.

Figure 6:
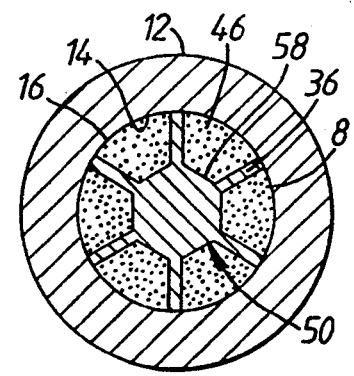

FIG. 6 is a transverse cross-section through a potted socket with the flat-sided tapered body and radial plate insert of FIG. 5 showing the rope elements distributed in the smaller cavities near the middle.

Figure 7:
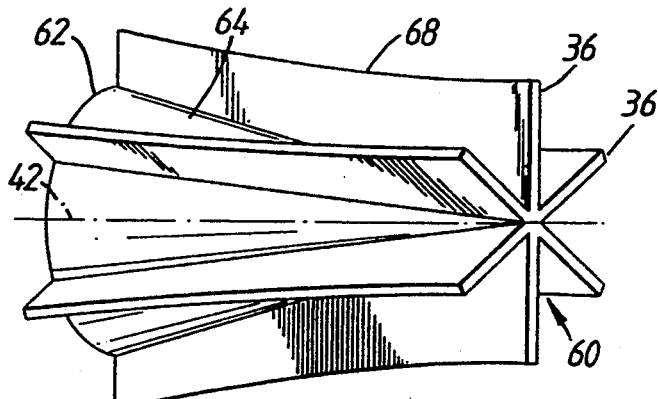

FIG. 7 is a conical tapered body and radial plate insert designed to reinforce and enhance the rope-element/resinous-material mixture within a tapered socket.

Figure 8:
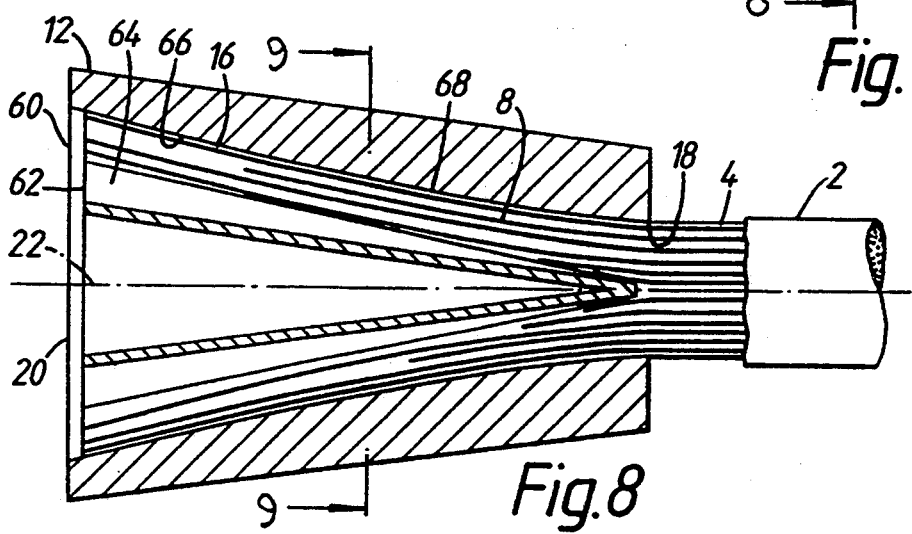

FIG. 8 is a longitudinal cross-section through a potted socket with the conical tapered body and radial plate insert of FIG. 7 showing the rope element distribution.

Figure 9:
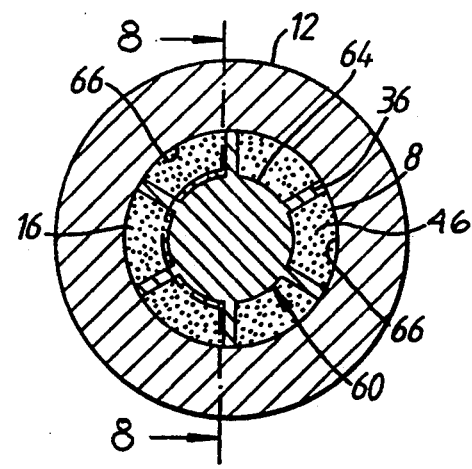

FIG. 9 is a transverse cross-section through the potted socket of FIG. 8 with the conical tapered body and radial plate insert of FIG. 7 showing the rope elements distributed in the smaller cavities near the middle.

Figure 10:
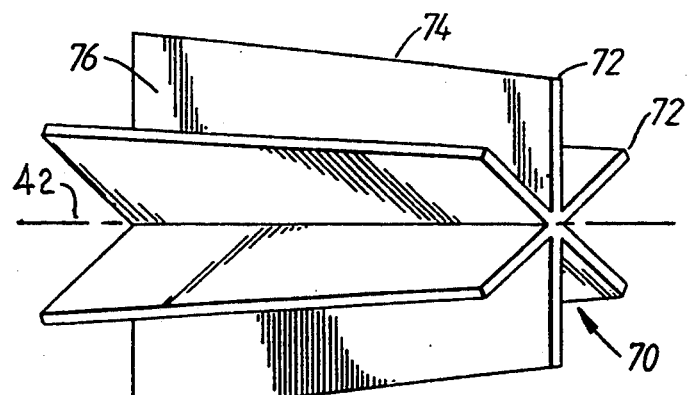

FIG. 10 is a radial plate insert designed to reinforce and enhance the rope element/resinous-material mixture within a tapered socket.

Figure 11:
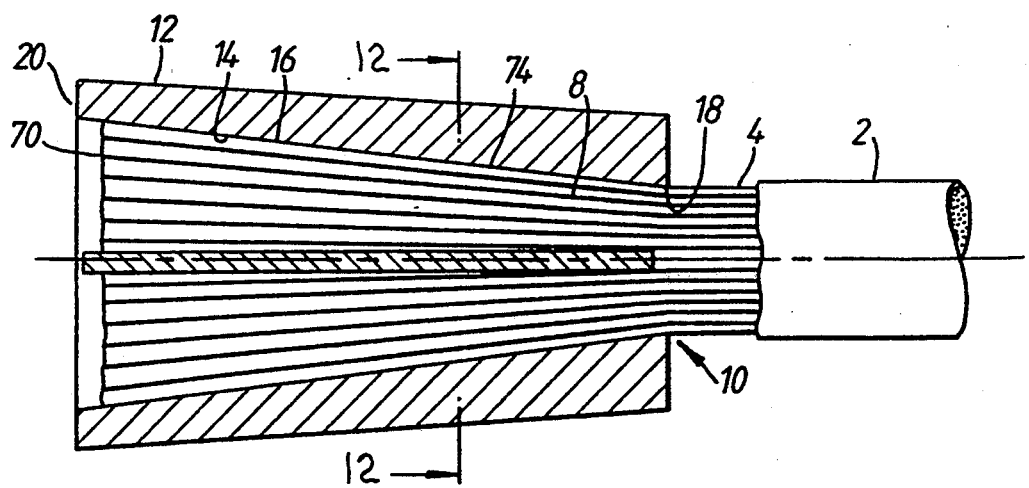

FIG. 11 is a longitudinal cross-section through a potted socket with the radial plate insert of FIG. 10 showing the rope element distribution.

Figure 12:
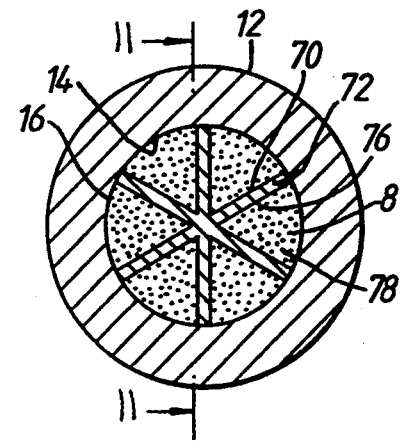

FIG. 12 is a transverse cross-section through the potted socket of FIG. 11 showing the rope element distribution within the smaller cavities.

Figure 13:
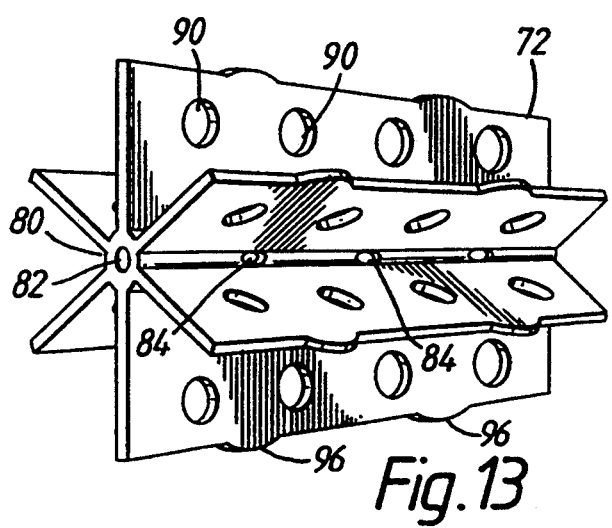

FIG. 13 is a perforated radial plate insert with tubular core, perforations, and stand-off lugs designed to reinforce and enhance the rope-element/resinous-material mixture within a tapered socket.

The following reference numbers are used throughout the drawings and the following description.

NOMENCLATURE

2 Fiber rope
4 Fibers or other rope elements
6 Resinous-material fill
8 Fiber-and-resinous-material-mixture plug
10 Potting socket
12 Socket barrel
14 Barrel inner surface
16 Barrel cavity
18 Cavity mouth
20 Cavity back
22 Cavity axis
24 Attachment lug
30 Round, curved tapered body and radial plate insert
32 Round, curved tapered body
34 Tapered body surface
36 Radial plate
38 Plate edge
40 Plate surface
42 Tapered body axis
44 Annular cavity
46 Cavity segment
50 Flat-sided tapered body and radial plate insert
52 Flat-sided tapered body
54 Pyramid-shaped forward section
56 Pyramid-frustrum-shaped rear section
58 Flat-sided tapered body surface
60 Conical tapered body and radial plate insert
62 Conical tapered body
64 Conical tapered body surface
66 Barrel cavity curved inner surface
68 Plate curved edge
70 Radial plate insert
72 Radial plate
74 Plate edge
76 Plate surface
78 Cavity segment
80 Central cylinder or tube
82 Tube passage
84 Tube perforations
90 Plate perforations
96 Plate stand-off tabs

DETAILED DESCRIPTION OF THE INVENTION

Description of Basic Tapered Body and Radial Plate Insert

Refer to FIGS. 1, 2, 3 and 4 which show a potting socket termination with a round, curved tapered body and radial plate insert.

FIG. 2 is a cross-section through the potted socket with tapered body and radial plate insert. A rope 2 is comprised of many rope elements 4. Generally rope elements 4 are individual fibers, but they may be yarns or strands made up of fibers, they may be wires, as used to make up wire ropes and cables, or they may be wire-like rope elements such as carbon rods.

A potting socket 10 consists of a barrel 12. Barrel 12 is usually made of metal but may be made of other suitable material. Barrel 12 is hollow, having an inner surface 14 which defines a barrel cavity 16. Barrel cavity 16 is tapered along at least a portion of the length of barrel 12. The narrow end of barrel cavity 16 is called the mouth 18. The wide end is called the back 20. Barrel cavity 26 is symmetrical about cavity axis 22. Barrel 12 may be provided with lugs 24 for attachment or may have other means of attachment to a fixed point or another object not shown.

Figure 1:
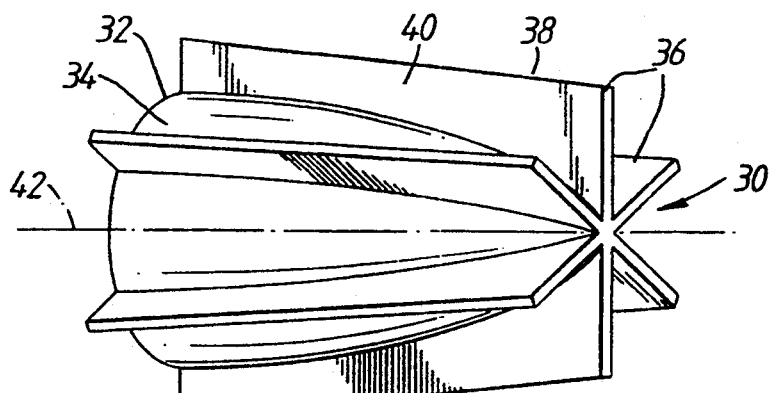
FIG. 1 is a round, curved tapered body and radial plate insert designed to reinforce and enhance the rope-element/resinous-material mixture within a tapered socket.

A tapered body and radial plate insert 30, shown in FIG. 1, consists of a tapered body 32 and a number of radial plates 36. The surface 34 of tapered body 32 in this case is a surface of revolution generated by a curved line. Tapered body 32 is smaller than barrel cavity 16 in potting socket 10.

Plates 36 extend radially from surface 34 of tapered body 32. Plates 36 are substantially equally angularly spaced from each other. The outer edges 38 of plates 36 substantially conform to the size and shape of barrel inner surface 14. When tapered body and radial plate insert 30 is placed within barrel cavity 16, plate edges 38 rest against barrel inner surface 14.

Tapered body 32 fills part of barrel cavity 16 and forms an annular cavity 44 between barrel inner surface 14 and tapered body surface 34. Annular cavity 44 maintains substantially the same transverse cross-sectional area over at least a portion of the length of barrel 12.

Figure 3:
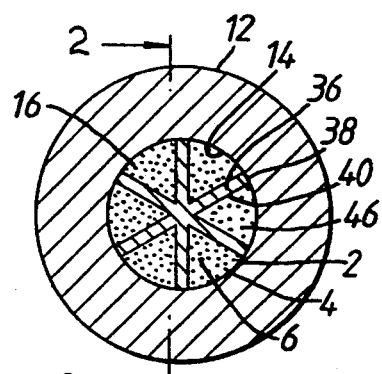
FIG. 3 is a transverse cross-section through the potted socket of FIG. 2 (and also of FIG. 5 and FIG. 10)

In other words, at some distance behind cavity mouth 18, shown in cross section in FIG. 4, the cross-sectional area of annular cavity 44 between barrel inner surface 14 and tapered body surface 40, shown in FIG. 4 is substantially the same as the cross-sectional area of barrel cavity 16 at cavity mouth 18, shown in FIG. 3.

Tapered body 32 must be positioned in the center of tapered cavity 16 and at the proper distance from cavity mouth 18 in order to achieve the desired constant cross-sectional area. Radial plates 36 position the axis 42 of tapered body 32 along the axis 22 of barrel cavity 16. Radial plates 36 also maintain tapered body 32 at the proper distance from cavity mouth 18.

Radial plates 36 divide cavity mouth 18 into a series of smaller cavity segments 46 defined by facing surfaces 40 of adjacent plates 36, as shown in FIG. 3.

Radial plates 36 also divide annular cavity 44 between barrel inner surface 14 and tapered body surface 34 into a series of smaller cavity segments 46. Cavity segments 46 are formed by a portion of barrel inner surface 14, a portion of tapered body surface 34, and surfaces 40 of adjacent plates 36, as shown in FIG. 4.

In each cavity segment 46 of the assembled potted socket termination, rope elements 4 and resinous material 6 are combined in a fiber-and-resinous-material-mixture plug 8. Fiber-and-resinous-material-mixture plug 8 has the properties of a composite material which forms a plug and resists pull out from cavity segments 46.

The term resinous material is not limited here to the general family of castable synthetic polymer resins. The term resinous material is intended here to refer to any material which can be poured or injected in a liquid state and will then set to a solid state and which after hardening can provide adequate strength and adhesion properties when combined with rope elements 4. This then includes materials which may be softened by heating as well as those which set due to a chemical reaction.

Assembly of Basic Potted Socket With Insert

In preparation for assembling the above described potted socket with tapered body and radial plate insert, potting socket 10 is supported with axis 22 vertical and with cavity back 20 upward. An end of fiber rope 2 is brought up through cavity 16 such that it is exposed above cavity back 20.

A mark is made at a distance back from the end of rope 2 corresponding to the final desired depth of rope within barrel cavity 16 plus an adequate length for handling the ends of rope elements 4 during assembly. A tape (not shown) is tightly wrapped around rope 2 at this point. The end of fiber rope 2 is prepared by removing any rope jacketing (not shown). This end of fiber rope 2 is then disassembled into individual rope elements 4 down to the taped point. It is preferred that rope elements 4 be the fibers, but the use of larger rope elements, for example yarns or strands may be satisfactory in some rope designs. Individual rope elements 4 are separated and broomed out.

It is preferred that the number of radial plates 36 and thus the number of cavity segments 46 be equal to or a fraction of the number of strands or other principal rope elements of rope 2 to be terminated. For example if rope 2 has 6, 18, or 36 strands (not counting core) then preferably there are 6 radial plates 36.

After the end of rope 2 has been prepared as described above, rope elements 4 are brought together in natural groups corresponding in number to the number of cavity segments 46. For example, if rope 2 has 18 strands and there are to be 6 cavity segments 46 then 6 distinct groups of rope elements 4 are formed, and each group is comprised of rope elements from 3 adjacent strands. Each rope element group is temporarily bound, for example by wrapping a paper band or a yarn spirally around it from near the taped point for a distance at least in excess to the depth of cavity 16.

Tapered body and radial plate insert 30 is mounted on the prepared end of rope 2. The narrow end of tapered body 32 is pointing down, adjacent to the taped point on rope 2. Rope element groups are appropriately arranged between radial plates 36.

Rope 2 with tapered body and radial plate insert 30 is then drawn back into barrel cavity 16 until plate edges 38 come essentially in contact with barrel inner surface 14. The paper band or yarn wrapping is then removed from each rope element group. A seal, for example putty (not shown), is placed around rope 2 below potting socket and in contact with cavity mouth 18.

The liquid potting resinous material is prepared, following manufacturer's instructions. The liquid potting resinous material is then poured into each cavity segment 46 while the exposed ends of rope elements 4 are worked to assure full penetration. Tapered body and radial plate insert 30 is then pressed down to assure it is seated against barrel inner surface 14. Gentle tension is momentarily applied to the ends of rope elements 4 to assure they are essentially straight within cavity segments 46. The liquid potting resinous material is then allowed to set and harden in accordance with manufacturer's instructions.

After potting resinous-material fill 6 has set and hardened, the exposed ends of rope elements 4 are trimmed off. The seal around cavity mouth 18 may also be removed.

The assembly is now complete. A fiber-and-resinous-material-mixture plug 8 has been produced within each cavity segment 46. This fiber-and-resinous-material-mixture plug 8 is a composite material which prevents rope 2 from being withdrawn from potting socket Function of Basic Potted Socket With Insert The assembled potted socket 10 with tapered body and radial plate insert 30 and rope 2 is attached to an anchor point or an object to be lifted (not shown) by attachment lugs 24. When tension is applied to rope 2, rope elements 4 tend to be drawn out of barrel cavity 16. This tendency is resisted by the action of fiber-and-resinous-material-mixture plug 8, comprised of rope elements 4 and resinous-material fill 6.

If tapered body and radial plate insert 30 were not present, shear of resinous-material fill 6 between rope elements 4 would allow those rope elements 4 near cavity axis 22 to move forward within cavity 16 with respect to those rope elements 4 near barrel inner surface 14. This movement would decreasing the extension of those elements 4 near cavity axis 22 relative to those rope elements 4 near barrel inner surface 14.

The resulting change in relative extensions between rope elements 4 in different parts of barrel cavity 16 would change the distribution of loads among these rope elements 4. Those rope elements 4 near barrel inner surface 14 would carry higher loads and would fail at a lower total tension in rope 2.

Also if tapered body and radial plate insert 30 were not present, the resinous-material volume ratio behind cavity mouth 18 would be higher than the resinous-material volume ratio at cavity mouth 18. Thus fiber-and-resinous-material-mixture plug 8 behind cavity mouth 18 would not be as strong or as stiff. As a result, most of the transfer of load between rope elements 4 and socket barrel 12 would have to take place at and adjacent to cavity mouth 18.

Tapered body and radial plate insert 30 divides barrel cavity 16 into smaller cavity segments 46. This decreases the distance between any rope element 4 and a supporting wall, either barrel inner surface 14, tapered body surface 34, or plate surface 40. The differences in extensions between rope elements 4 is much reduced. As a consequence, the resulting load increases in rope elements 4 near supporting surfaces is also reduced. Thus the effective breaking strength of terminated rope 2 is increased.

Tapered body and radial plate insert 30 maintains a substantially constant cross-sectional area within cavity segments 46 for a distance into socket barrel 12. This produces a substantially constant resinous-material volume ratio over this distance. As a result, the strength and stiffness properties of fiber-and-resinous-material-mixture plug 8 are essentially the same over this distance. Thus transfer of load between rope elements 4 and socket barrel 12 can take place over a greater distance, and the effective breaking strength of terminated rope 2 is increased.

Alternative Tapered Body and Radial Plate Inserts

FIGS. 5 and 6 show an alternative potted socket termination with a two section straight-sided pyramid tapered body and radial plate insert.

A straight-sided tapered body and radial plate insert 50, shown in FIG. 5, consists of a straight-sided tapered body 52 and a number of radial plates 36. Straight-sided tapered body 52 is comprised of two sections. A front section 54 is pyramid shaped. A rear section 56 is shaped like a pyramid frustum. Front section 54 and rear section 56 join such that the flat surfaces match, forming a continuous surface 58. Tapered body 52 is smaller than barrel cavity 16 in potting socket 10.

As in the earlier embodiment, several plates 36 extend radially from surface 58 of tapered body 52. When tapered body and radial plate insert 50 is placed within barrel cavity 16, plate edges 38 rest against barrel inner surface 14, as shown in FIG. 6.

As in the earlier embodiment, straight-sided tapered body 52 serves to fill part of barrel cavity 16 such that the resulting annular cavity 44 between socket barrel inner surface 14 and tapered body surface 58 has substantially the same transverse cross-sectional area over at least a portion of the length of socket barrel 12.

As in the earlier embodiment, radial plates 36 serve to position the axis 42 of tapered body 52 essentially along axis 22 of barrel cavity 16. Also, radial plates 36 divide annular cavity 44 between socket barrel inner surface 14 and tapered body surface 58 into a series of smaller cavity segments 46. These cavity segments are best shown in FIG. 6.

FIGS. 7, 8 and 9 show another alternative potted socket termination with a conical tapered body and radial plate insert.

A conical tapered body and radial plate insert 60, shown in FIG. 7, consists of a conical body 62 and a number of radial plates 36. The surface 64 of conical tapered body 62 is a surface of revolution generated by a straight line. Tapered body 62 is smaller than barrel cavity 16 in potting socket 10.

In order to maintain a constant cross-sectional area annular cavity about conical tapered body 60, the slope of barrel cavity inner surface 66 must increase with distance from cavity mouth 18. Thus barrel cavity inner surface 66 is an enlarging curved surface of rotation.

As in the earlier embodiments, several plates 36 extend radially from surface 64 of tapered body 62. The edges 68 of plates 36 are curved to correspond to the shape of cavity curved inner surface 66. When tapered body and radial plate insert 60 is placed within barrel cavity 16, plate curved edges 68 rest against cavity curved inner surface 66, as shown in FIG. 8.

As in the earlier embodiments, straight-sided tapered body 62 serves to fill part of barrel cavity 16 such that the resulting annular cavity 44 between tapered body surface 64 and cavity curved inner surface 66 has substantially the same transverse cross-sectional area over at least a portion of the length of socket barrel 12.

As in the earlier embodiment, radial plates 36 serve to position the axis 42 of tapered body 62 essentially along axis 22 of barrel cavity 16. Also, radial plates 36 divide annular cavity 44 between socket barrel curved inner surface 66 and tapered body surface 64 into a series of smaller cavity segments 46. These cavity segments are best shown in FIG. 9.

Alternative Radial Plate Insert

FIGS. 10, 11 and 12 show another potted socket embodiment with a simple radial plate insert.

A radial plate insert 70 consists of a number of plates 72 arranged about and extending outward from a central axis 42. Plates 72 are at essentially equal angular spacings from each other.

The outer edges 74 of these plates substantially conform to the size and shape of barrel inner surface 14, such that when radial plate insert 70 is placed within barrel cavity 16, plate edges 74 rest against barrel inner surface 14.

Radial plates 72 serve to divide barrel cavity 16 into a number of smaller cavity segments 78, best shown in FIG. 12. Cavity segments 78 are formed by a portion of barrel inner surface 14 and facing surfaces 76 of adjacent plates 72.

Less relative displacement occurs between rope elements 4 within these smaller cavity segments 78. As a result, rope elements 4 more equally share loads due to tension in rope 2. Thus the strength of terminated rope 2 is greater.

FIG. 13 shows several other enhancements to the radial plate insert. It is obvious that these enhancements can also be used with the tapered body and radial plate insert embodiments shown above.

A tube or cylinder 80 serves as the center support for radial plates 72. This feature may facilitate assembly.

A passage 82 extends partially or fully through cylinder 80 to comprise a tube. Holes or perforations 84 through tube 80 communicate between passage 82 and cavity segments 78 or 46. Passage 82 and perforations 84 serve as a means of injecting liquid resinous material throughout all portions of cavity segments 78 or 46. This facilitates full penetration and mixing of liquid resinous material with rope elements 4 and thus enhances the properties of fiber-and-resinous-material-mixture plug after resinous-material fill 6 hardens.

A number of perforations 90 communicate through radial plates 72. Perforations 90 allow flow of liquid resinous material between adjacent cavity segments 78 or 46. Perforations 90 also serve as a means of locking resinous-material fill 6 to plate surfaces 76 or 36.

A number of stand-off lugs 96 are provided on plate edges 74, 38, or 68 of radial plates 72 or 36. Stand-off lugs 96 allow flow of resinous material between adjacent cavity segments 78 or 46. Stand-off lugs 96 may be made of a material substantially softer than plates 72 or 36. Thus stand-off lugs 96 can deform as tension is exerted on rope 2, allowing the entire body consisting of plates 72 or 46, and fiber-and-resinous-material-mixture plugs 8 to move forward within barrel cavity 16 and increase the wedging action.

SUMMARY AND CONCLUSION

Several alternative methods of improving the strength efficiency of potted socket rope terminations have been described above. These improvements overcome the problems usually associated with stress concentration at the mouth of the socket and relative movement of rope elements within large cavities.

A tapered insert is placed within the potted socket barrel cavity to produce a more uniform distribution of fiber and resinous material along the length of the cavity. This reduces the stress concentration at the mouth of the cavity and increases rope breaking strength efficiency.

Radial plates divide the large barrel cavity into smaller cavities to reduce the relative movement between rope elements. This reduces the resulting load imbalance among rope elements and increases rope breaking strength efficiency.

Holes within the tapered insert and through the radial plates facilitate injection of liquid resinous material within the cavities.

It will be obvious that the various embodiments and details can be combined in other forms to produce the same results. Other modifications can also obviously be made to the particular embodiments while remaining within the intended scope of the following claims.

Thus the invention is limited only by the following claims.

What is claimed is:

1. A termination for a flexible tension member comprising:
a socket barrel,
an inner wall within said socket barrel,
said inner wall forming a cavity within said socket barrel,
said cavity being substantially symmetrical about a principal cavity axis, a body within said cavity,
said body being substantially symmetrical about a principal body axis,
said body axis being substantially coincident with said cavity axis,
plates extending radially from said body substantially to said socket barrel inner wall, has been inserted to provide antecedent basis for applicant's amendments;
a plurality of broomed out elements of said tension member extending into each of said cavity segments,
a resinous material forming a mixture with said elements within said cavity, and
said mixture of elements and resinous material forming a plug within said cavity.

2. The termination of claim 1 wherein:
said cavity segments are substantially larger in cross-sectional area than said tension member elements within them in at least one position along the cavity axis.

3. The termination of claim 1 wherein:
passages and holes extend between said cavity segments effectively facilitating flow of said resinous material while in a liquid state.

4. The termination of claim 1 wherein:
said body is tapered and effectively reduces the cross-sectional area of said cavity.

5. The termination of claim 4 wherein:
said cavity cross-sectional area is substantially constant for at least a portion of the length of said cavity.

6. The termination of claim 4 wherein:
said plates maintain said body substantially in a fixed longitudinal and axial alignment with respect to said socket barrel inner wall.

7. A termination for a tension member in which broomed out elements of said tension member and a resinous material combine to form a composite mixture plug within a tapered cavity, said tapered cavity is divided into cavity segments by radial plates extending outward substantially to a wall of said tapered cavity, and a plurality of said broomed out elements extend into each cavity segment.

8. The termination of claim 7 in which said tapered cavity is partially filled with a tapered body.

9. The termination of claim 8 in which said tapered body produces a substantially constant cross-sectional area between said body and said wall of the tapered cavity along at least a portion of the length of said cavity.

10. The termination of claim 8 in which said plates maintain said tapered body substantially coaxial within said tapered cavity.

11. A termination for a tension member comprising:
a socket barrel,
a cavity peripheral wall forming a major cavity within said barrel,
said cavity being substantially symmetrical about a principal cavity axis,
a plurality of radial plates extending substantially radially outward from said cavity axis,
said radial plates substantially extending to said cavity peripheral wall,
said radial plates substantially dividing said major cavity into a plurality of cavity segments,
a plurality of broomed out elements of said tension member extending into each of said cavity segments,
resinous material inserted into said cavity segments and forming a mixture with said tension member elements,
wherein said mixture of tension member elements and said resinous material forms plugs within said cavity segments when said resinous material becomes hard.

12. The termination of claim 11 wherein:
said major cavity is smaller at one end than at the other end.

13. The termination of claim 12 further comprising:
an insert body,
said insert body being substantially symmetrical about a principal body axis,
said radial plates operably attached to said insert body, and,
said radial plates positioning said body axis substantially along said cavity axis.

14. The termination of claim 13 wherein:
said insert body is substantially smaller on one end than on the opposite end, said insert body has an outer surface wall forming a surface of at least one cavity segment, said body outer surface wall and said cavity peripheral wall are each shaped such that a cross-sectional area between said body outer surface wall, said radial plates, and said cavity peripheral wall which is perpendicular to said cavity axis of at least one of said cavity segments is substantially constant for at least a portion of the length of said insert body.

15. The termination of claim 11 wherein:

said cavity segments have substantially greater cross-sectional area than said tension member elements within them in at least one position along said cavity axis.

16. The termination of claim 11 wherein:

holes are provided in said radial plates, such that said resinous material can communicate through said radial plates.

17. The termination of claim 11 wherein:

said radial plates are operably spaced from said cavity peripheral wall by tabs, such that said resinous material can communicate around said radial plates.

18. The termination of claim 17 wherein:

said tabs are comprised of material which is substantially softer than the material of said radial plates, such that said tabs can compress.

19. The termination of claim 13 further comprising:

a body passage extending through at least a portion of the length of said insert body, body holes extending from said body passage through said insert body and communicating with at least one of said cavity segments, such that said resinous material may be inserted through said body passage and said body holes and communicate into said cavity segments.

* * * * *